US008806510B2

(12) United States Patent
Andrade et al.

(10) Patent No.: US 8,806,510 B2
(45) Date of Patent: Aug. 12, 2014

(54) DETERMINING OPERATOR PARTITIONING CONSTRAINT FEASIBILITY

(75) Inventors: Henrique Andrade, Croton-on-Hudson, NY (US); Bugra Gedik, White Plains, NY (US); Kirsten Weale Hildrum, Hawthorne, NY (US); Rohit Madhukar Khandekar, Elmsford, NY (US); Sujay Sunil Parekh, Dobbs Ferry, NY (US); Deepak Rajan, Fishkill, NY (US); Joel Leonard Wolf, Katonah, NY (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 12/556,931

(22) Filed: Sep. 10, 2009

(65) Prior Publication Data
US 2011/0061060 A1    Mar. 10, 2011

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ............ 719/320; 719/313; 719/318; 719/319

(58) Field of Classification Search
None
See application file for complete search history.

(56) References Cited

U.S. PATENT DOCUMENTS

| | | | |
|---|---|---|---|
| 8,103,486 B1 * | 1/2012 | Rolia et al. ......................... 703/2 |
| 2004/0049295 A1 * | 3/2004 | Wojsznis et al. ................ 700/28 |
| 2004/0078689 A1 * | 4/2004 | Knuutila et al. ................ 714/38 |
| 2006/0201229 A1 * | 9/2006 | Zhu et al. ......................... 72/413 |
| 2008/0153506 A1 * | 6/2008 | Yin et al. .................... 455/452.2 |
| 2009/0089789 A1 * | 4/2009 | Faltings et al. ............... 718/104 |
| 2009/0138300 A1 * | 5/2009 | Kagan et al. ...................... 705/7 |

OTHER PUBLICATIONS

U.S. Appl. No. 12/489,805, filed Jun. 23, 2009, titled Partitioning Operator Flow Graphs.
U.S. Appl. No. 12/465,757, filed May 14, 2009, titled Profile-Driven Stream Processing.
P. Hall, On representatives of subsets, J. London Math. Soc. 10, 1935, 26-30.

\* cited by examiner

*Primary Examiner* — H S Sough
*Assistant Examiner* — Craig Dorais
(74) *Attorney, Agent, or Firm* — Ryan, Mason & Lewis, LLP

(57) ABSTRACT

Techniques for determining feasibility of a set of one or more operator partitioning constraints are provided. The techniques include receiving one or more sets of operator partitioning constraints, wherein each set of one or more constraints define one or more desired conditions for grouping together of operators into partitions and placing partitions on hosts, wherein each operator is embodied as software that performs a particular function, processing each set of one or more operator partitioning constraints to determine feasibility of each set of one or more operator partitioning constraints, creating and outputting one or more candidate partitions and one or more host placements for each set of feasible partitioning constraints, and creating and outputting a certificate of infeasibility for each set of infeasible partitioning constraints, wherein the certificate of infeasibility outlines one or more reasons for infeasibility.

22 Claims, 6 Drawing Sheets

DETERMINING OPERATOR PARTITIONING CONSTRAINT FEASIBILITY

GOVERNMENT CONTRACT

This invention was made with Government support under Contract No.: H98230-07-C-0383 awarded by the United States Department of Defense. The government has certain rights in this invention.

FIELD OF THE INVENTION

Embodiments of the invention generally relate to information technology, and, more particularly, to stream processing.

BACKGROUND OF THE INVENTION

In environments where jobs include fine-grained operators connected via data into flow graphs, such as in stream processing and similar computer system environments, it is often desirable for purposes of efficiency to coalesce the operators into partitions which can then be scheduled on multiple heterogeneous hosts in a load balanced manner. An operator is a piece of software that carries out a given function, and a data flow graph is a description of the connection between and functionality of the operators in the system. A host may be any type of processor that executes the operator, and a partition may be a grouping together of the operators for purposes of execution by one or more hosts. For example, there may be three operators A, B and C that respectively perform the functions of joining inputs, and two of these operators A and B may be partitioned together so they run on the same host, while the third operator C may be in a separate partition that runs on a separate host.

Consider, for example, an application processing scientific data. Some of the operators pull data from outside, and as such require a high central processing unit (CPU) percentage, and must be located on the hosts with outside connectivity. Thus, the user resource matches these input operators to I/O nodes, and at the same time, declares that they must not share the host with any other CPU intensive operators (also referred to herein as a "host ex-location" constraint). It may be impossible to partition the operators in such a way that satisfies all the constraints. For instance, consider three examples of sets of constraints which do not admit to any solution.

The first example includes three constraints. Constraint 1 states that operators A and B cannot be placed in the same partition; constraint 2 states that operators A and C must be placed in the same partition; and constraint 3 states that the operators B and C must be placed in the same partition. It is clear that the operators A, B, and C cannot be placed in partitions while satisfying all the three constraints.

The second example includes three constraints. Constraint 1 states that operators A and B must be placed in the same partition; constraint 2 states that the partition containing operator A must be assigned to a host in the set $\{h_1, h_2\}$; and constraint 3 states that the partition containing operator B must be assigned to host $h_3$. It is clear that there is no partitioning and a host assignment satisfying all three constraints.

The third example includes four constraints. Constraint 1 states that no two operators in the set $\{A, B, C\}$ must be placed in the same partition; constraints 2, 3, and 4 state that the partitions containing operators A, B, and C, respectively, must be assigned to a host in the set $\{h_1, h_2\}$. Because the three partitions containing operators A, B, and C need to be assigned to distinct hosts in the set $\{h_1, h_2\}$, there is no partitioning and a host assignment satisfying all four constraints.

In large operator graphs with many constraints, it is not easy to determine whether there is a partitioning of the operators so that all constraints are satisfied. Existing approaches cannot determine quickly and with high accuracy whether or not a specified set of constraints admits any solution.

SUMMARY OF THE INVENTION

Principles and embodiments of the invention provide techniques for determining operator partitioning constraint feasibility. An exemplary method (which may be computer-implemented) for determining feasibility of a set of one or more operator partitioning constraints, according to one aspect of the invention, can include steps of receiving one or more sets of operator partitioning constraints, wherein each set of one or more constraints define one or more desired conditions for grouping together of operators into partitions and placing partitions on hosts, wherein each operator is embodied as software that performs a particular function, processing each set of one or more operator partitioning constraints to determine feasibility of each set of one or more operator partitioning constraints, creating and outputting one or more candidate partitions and one or more host placements for each set of feasible partitioning constraints, and creating and outputting a certificate of infeasibility for each set of infeasible partitioning constraints, wherein the certificate of infeasibility outlines one or more reasons for infeasibility.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the folio of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
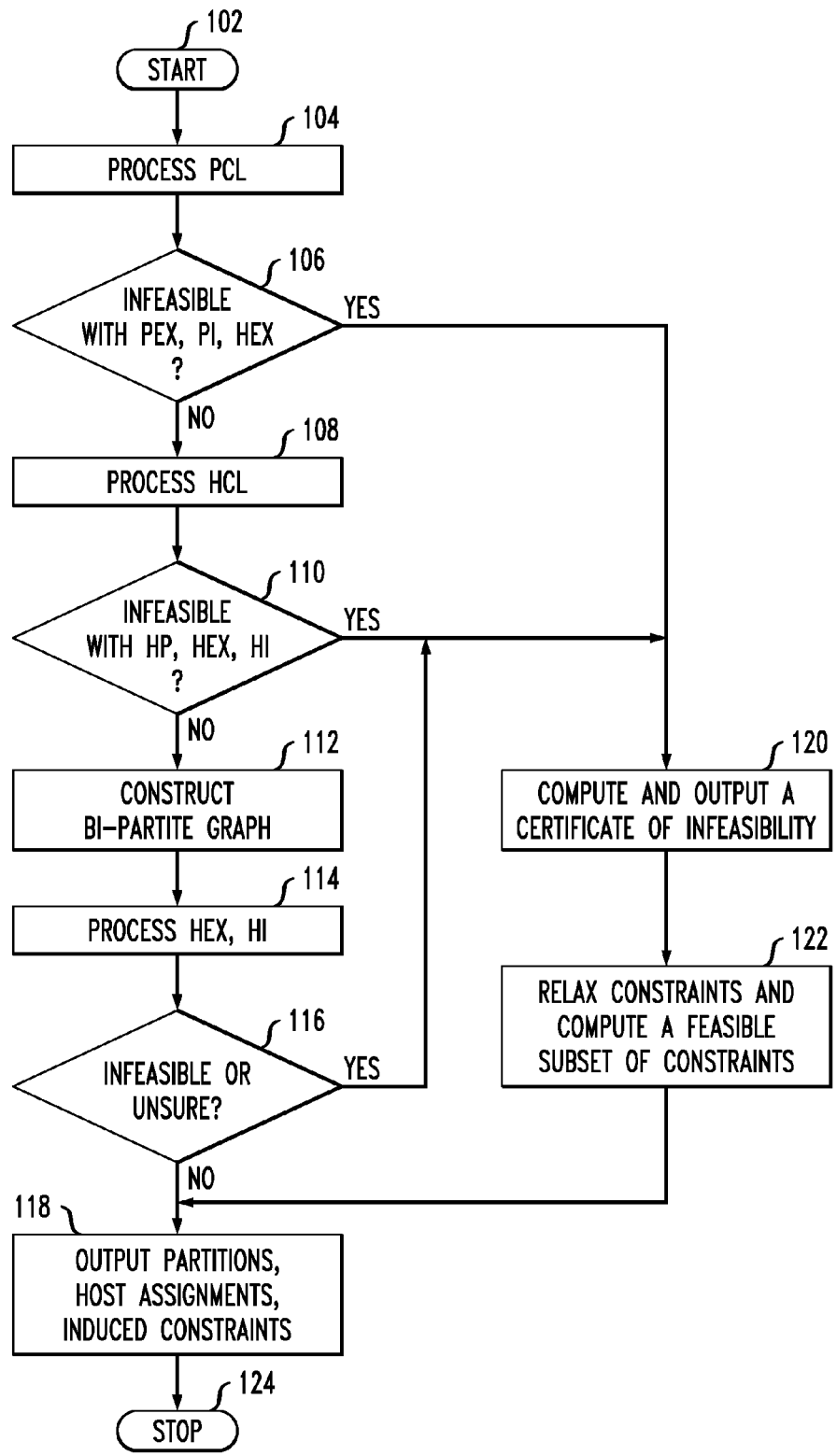
FIG. 1 is a flow diagram illustrating a process for determining feasibility of one or more operator partitioning constraints, according to an embodiment of the invention.

Principles of the invention include checking the feasibility of operator partitioning problem constraints. As described herein, in stream processing and similar computer system environments, it can be desirable to create partitions by fusing fine-grained operators connected via data flow graphs into partitions, subject to various user-defined constraints. One or more embodiments of the invention include addressing the constraint feasibility problem by examining each constraint type in a specified sequence.

As detailed herein, in one or more embodiments of the invention, all steps except for the last step are exact in the sense that if no feasible solution is found, then none exists. With the last step, there may exist a feasible solution even if the invention is unable to find it. In one or more embodiments of the invention, a user can be notified (for example, via a "certificate of infeasibility") if no feasible solution can be found, and may then relax some of the constraints. Also, the techniques described herein can include ordering the constraint types by importance, such as, for example (in decreasing order), partition co-location, partition ex-location, partition isolation, resource matching, host co-location, host ex-location, and host isolation (also, high availability can be seen to be a particular type of host ex-location constraint), and then automatically relax the least important offending constraints.

The techniques detailed herein are capable of giving a fast response to a feasibility question, even in advance of running an operating partition optimizer. One or more embodiments of the invention include handling heterogeneous processing environments, as well as providing a feasible solution to a user, if such a solution can be found, for possible user modification, if an operating partition optimizer is not being employed. Induced host level constraints for the computed partitions can be derived for use by a scheduler if a feasible solution can be found, and a "Certificate of Infeasibility" (as referred to and described herein) can be identified if the constraints are collectively infeasible.

One or more embodiments of the invention can work toward completing within a specified amount of time (for example, a deadline). It can include an "auto mode" capable of relaxing offending constraints according to a pre-specified ordering and finding a feasible solution to remaining problems. Additionally, a "manual mode" can include interacting with user through a user interface (UI), with user-controlled constraint relaxations and/or revisions. Further, for difficult problems, one or more embodiments of the invention are capable of answering a feasibility question with "maybe," that is, no solution can be found but constraints may or may not be feasible. Also, more time can be iteratively requested, in amount chosen by user, to possibly find a definitive answer. If the time given is large enough, a definitive answer will be found.

By way of example, the inputs to a constraint feasibility checking problem can include a directed graph, vertices (that is, operators), arcs (that is, streams), placement constraints, etc. Outputs can include, for example, a fusion of operators into partitions and its host placement if the constraints are feasible, as well as a Certificate of Infeasibility if the constraints are infeasible.

As detailed herein, placement constraints can include, for example, resource matching hints (wherein an operator can be assigned only to a subset of the hosts), partition co-location constraints (wherein two or more operators must be fused into the same processing element (PE) and/or partition), partition ex-location constraints (wherein two or more operators must be fused into separate PEs and/or partitions), host co-location hints (wherein two or more operators must be assigned to the same host), host ex-location hints (wherein two or more operators must be assigned to separate hosts), partition isolation constraints (wherein an operator must be fused into a single PE and/or partition), host isolation hints (wherein the PE and/or partition containing an operator must be placed on a host by itself), and high availability (HA) constraints/hints (which create multiple sub-graph replicas with PEs respecting sub-graphs and host ex-location constraints for any PEs and/or partitions in distinct replicas).

As also detailed herein, in one or more embodiments of the invention, partition co-location constraints can be handled by merging co-located operators into single mini-partitions and testing whether partition ex-location constraints contradict the current merged mini-partitions. If two operators are merged but also ex-located by a partition ex-location identifier, there is no feasible solution. The two merged and also ex-located operators constitute a certificate of infeasibility. Note, also, that host ex-location implies partition ex-location, but not the reverse. As such, partition ex-location constraints induced by host ex-location constraints can be used in this step as well. Additionally, host co-location can be handled by merging co-located mini-partitions into single host buckets. Note that partition co-location implies host co-location, but not the reverse.

Further, resource matching can be handled by forcing each host bucket to be resource matched to the intersection of the resource matching sets of the operators in that host bucket. If any host bucket now has an empty resource matching, there is no feasible solution. That host bucket and the constraints that formed it constitute a certificate of infeasibility. Also, host ex-location can be handled by iterative steps each including bookkeeping and a bipartite matching scheme. If the bipartite matching scheme produces an incomplete matching at any step, a feasible solution cannot be found.

As noted above and detailed further herein, the input to the placement constraint checker problem can include a set of n operators denoted by V, a set of m hosts denoted by U, and a set of "placement constraints" described in detail herein. A goal of the constraint checker problem is to decide if there exists a feasible partitioning of V into partitions and an assignment of partitions to hosts. For an operator $v \in V$, one or more embodiments of the invention use $p(v) \subseteq V$ to denote the partition that v will belong to, and for a partition $S \subseteq V$, $h(S) \in U$ is used to denote the host to which S is assigned. Also, an operator v is placed on host $g \in U$ if $g = h(p(v))$.

The placement constraints specify the restrictions on the partitioning p and the assignment h. As noted above, the constraints can include multiple types. There is one host placement constraint per operator. Aside from the host placement constraint, the input can have zero or more constraints of each type.

Partition co-location (PCL) is specified by a subset S of operators. This constraint, denoted by PCL(S), states that for any two operators u, $v \in S$, we have $p(u) \, p(v)$. Partition ex-location (PEX) is specified by a subset S of operators. This constraint, denoted by PEX(S), states that for any two operators u, v∈S, we have p(u)≠p(v). Partition isolation (PI) is specified by a single operator v. This constraint, denoted by PI(v), states that |p(v)|=1. Host placement (HP) is specified by a single operator v and a subset of hosts H. This constraint, denoted by Host(v,H), states that h(p(v))∈H. There is exactly one HP constraint present for each operator in V. Host co-location (HCL) is specified by a subset S of operators. This constraint, denoted by HCL(S), states that for any two operators u, v∈S, we have h(p(u))=h(p(v)). Host ex-location (HEX) is specified by a subset S of operators. This constraint, denoted by HEX(S), states that for any two operators u, v∈S, we have h(p(u))≠h(p(v)). Also, host isolation (HI) is specified by a single operator v. This constraint, denoted by HI(v), states that for any operator u∈V with p(u)≠p(v), we have h(p(u))≠h(p(v)).

A goal in the placement constraint checker problem is to decide if there exists a partitioning p of V and an assignment h of each partition to a host in U such that all the given placement constraints are satisfied. If the answer is yes, the given set of constraints is called feasible, otherwise it is called infeasible. In a feasible instance, the goal also involves computing such a feasible partitioning, a feasible host assignment, and the induced host level constraints (HP, HCL, HEX, HI) for the computed partitions.

In an infeasible instance, the goal involves computing a minimal subset of input constraints which is infeasible, that is, an infeasible subset C of constraints such that every strict subset of C is infeasible. Such a minimal subset can be referred to herein as a "certificate of infeasibility," that is, a succinct proof that the given constraints are infeasible. The certificate of infeasibility is a useful feedback so that the user can change the input constraints in order to finally obtain a feasible set of constraints. Also, in a case of infeasibility, the goal can also involve a systematic way of relaxing some constraints automatically in order to obtain a feasible subset of constraints.

FIG. 1 is a flow diagram illustrating a process for determining feasibility of one or more operator partitioning constraints, according to an embodiment of the invention. Step 102 includes starting the techniques. Step 104 includes processing PCL and computing mini-partitions. Step 106 includes determining possible infeasibility of PCL with PEX, PI, and HEX. If there exists no infeasibility, one can proceed to step 108 which includes processing HCL and computing host buckets. If there does exist infeasibility, proceed to step 120, which includes computing and outputting a certificate of infeasibility.

Step 110 includes determining possible infeasibility of HCL with HP, HEX, and HI. If there exists no infeasibility, one can proceed to step 112 which includes constructing a bipartite graph between mini-partitions and hosts from HP. If there does exist infeasibility, proceed to step 120. Step 114 includes processing HEX and HI using an iterative algorithm based on bipartite matching subroutine. Also, step 116 includes determining whether there is infeasibility or uncertainty. If there does exist infeasibility, proceed to step 120. If there exists no infeasibility, one can proceed to step 118 which includes outputting the partitions, host assignments, and induced host level constraints on computed partitions.

Additionally, step 122 includes relaxing constraints and computing a feasible subset of constraints, and step 124 includes ending the techniques. Examples of one or more embodiments of the invention that include relaxing constraints and computing feasible sub-sets is described below herein.

In processing PCL and computing mini-partitions, one or more embodiments of the invention partition the set of operators into a collection of mini-partitions. These subsets are called mini-partitions since two or more mini-partitions can be merged later to form final partitions. Each operator can be placed into its own mini-partition, and for each constraint PCL(S), the mini-partitions containing operators in S can be merged into a single mini-partition. For example, if there are two constraints PCL($S_1$) and PCL($S_2$) where $S_1 \cap S_2$ is non-empty, after processing these constraints, the operators in $S_1 \cup S_2$ will be in a single mini-partition.

In determining possible infeasibility of PCL with PEX, PI, and HEX, one or more embodiments of the invention detect two types of possible infeasibilities. If there is a PEX(S) constraint such that there are two operators u, v∈S that belong to the same mini-partition, there exists an infeasibility of this PEX constraint with the PCL constraints. In such a case, the certificate of infeasibility includes the PEX(S) constraint along with the PCL constraints that imply the partition co-location of u and v. More precisely, one or more embodiments of the invention can compute minimum integer k such that there exists a sequence of the PCL constraints, PCL($S_1$), PCL($S_2$), ..., PCL($S_k$), such that u∈$S_1$, v∈$S_k$, and $S_i \cap S_{i+1}$ is non-empty for all i=1, 2, ..., k−1. Those skilled in the art will appreciate that such an integer k and a sequence can be computed by a shortest-path algorithm. The certificate of infeasibility then includes PEX(S) (and the constraints PCL($S_1$), PCL($S_2$), ..., PCL($S_k$). A similar infeasibility arises if the constraint PEX(S) is replaced with HEX(S).

Also, if there is a PI(v) constraint and a PCL(S) with v∈S and |S|>1, there exists an infeasibility of these PCL and PI constraints. The certificate of infeasibility includes PI(v) and PCL(S).

As depicted in FIG. 1, if infeasibility is not detected, one can proceed to processing HCL and computing host buckets. In this step, one or more embodiments of the invention partition the set of mini-partitions into a collection of host-buckets and place each mini-partition into its own host-bucket. For each constraint HCL(S), all host-buckets containing operators can be merged in S into a single host-bucket. For example, if there are two constraints HCL($S_1$) and HCL($S_2$) where $S_1 \cap S_2$ is non-empty, after processing these constraints, the operators in $S_1 \cup S_2$ will be in mini-partition(s) belonging to the same host-bucket. Also, let B denote the set of host-buckets.

In determining possible infeasibility of HCL with HP, HEX, PEX, and HI, one or more embodiments of the invention detect three types of possible infeasibilities. For example, consider a host-bucket b. For an operator v∈V, the notation that 'operator v belongs to host-bucket b' (and write v→b) is used to denote that the mini-partition containing v belongs to host-bucket b. Also, consider the host placement constraints HP(v,$H_v$) for operators v belonging to b. If the intersection, ∩{$H_v$|v→b}, of Host sets $H_v$ over all these operators v belonging to host-bucket b is empty, the mini-partitions in this host bucket cannot be assigned to any host. This leads to an infeasibility. The certificate of infeasibility includes the constraints that lead to the formation of host-bucket b and the minimal collection of corresponding HP constraints with empty intersection.

If there is a HEX(S) constraint with two operators u, v∈S such that the mini-partitions containing u and v belong to the same host bucket, it leads to an infeasibility. The corresponding certificate includes the constraint HEX(S) along with the minimal set of constraints that imply that u and v must be placed on the same host.

Additionally, suppose that there are two operators u and v such that the following holds. There is a HI(v) constraint, the mini-partitions containing u and v are distinct but belong to the same host bucket, and the operators u and v have implied partition ex-location, which leads to an infeasibility because the HI(v) constraint cannot be satisfied. Here, the implied partition ex-location can arise, for example, because there are operators u' and v' such that u belongs to the same mini-partition as u, v' belongs to the same mini-partition as v, and there is a PEX(S) constraint with u', v'∈S. The certificate of infeasibility in this case includes constraint HI(v) and the constraints that imply that u and v must be assigned to different partitions but same host.

If no infeasibility described above is detected, one or more embodiments of the invention can include performing the following possible merging of mini-partitions. For each host-bucket b such that there is an operator v, belonging to b, with a constraint HI(v), merge all mini-partitions in b into a single mini-partition. If infeasibility is not detected, one can proceed to constructing a bipartite graph between mini-partitions and hosts from HP. In this step, one or more embodiments of the invention construct a bi-partite graph G(B,U) as follows. The left-hand-side B is the set of host buckets and the right-hand-side U is the set of hosts. One can also add an edge (b,h) for b∈B and a host h∈H if h∈∩{$H_v$|v→b}.

In processing HEX and HI using an iterative algorithm based on a bipartite matching subroutine, one or more embodiments of the invention detect a possible infeasibility of satisfying the HEX constraints. For each HEX(S), the following test can be performed. Let B(S) denote the subset of host-buckets b such that there exists v∈S with v→b. Also, let G(S) denote the bi-partite graph G induced on B(S) and the hosts adjacent to B(S). Note that the constraints HEX(S) imply that each host-bucket in G(S) must be assigned to a distinct host in G(S).

One or more embodiments of the invention also determine if there exists a matching in G(S) that matches every host-bucket in G(S). Those skilled in the art will appreciate that this can be achieved using an augmenting-path-based bi-partite matching algorithm. If there does not exist such a matching, the matching algorithm computes a "Hall set." A Hall set in a bi-partite graph G(S)=(B(S),U) is a subset A⊆B(S), such that the number of hosts adjacent to A in G(S) is strictly less than |A|. See FIG. 2 for an illustration.

Figure 2:
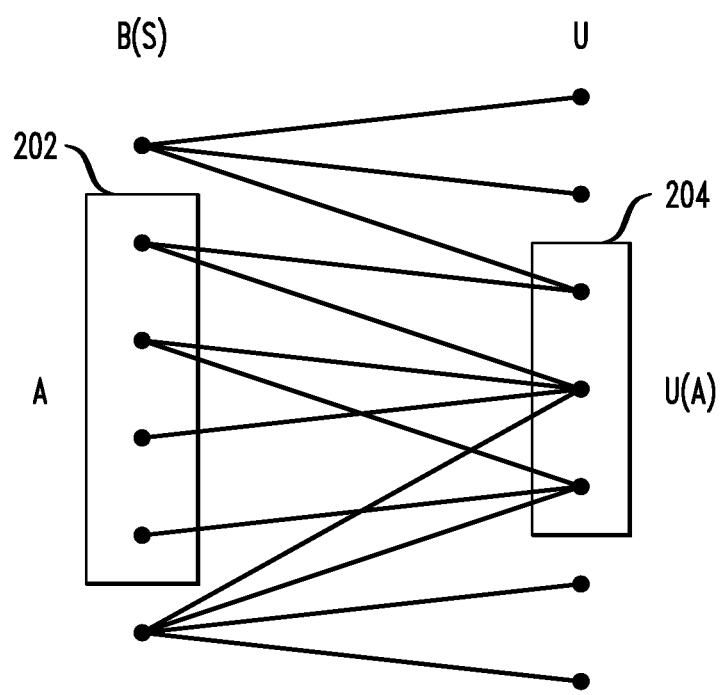
FIG. 2 is a diagram illustrating a Hall set, according to an embodiment of the present invention.

FIG. 2 is a diagram illustrating a Hall set A 202, according to an embodiment of the present invention. In FIG. 2, consider the subset A⊆B(S) with |A|=4. The set of hosts adjacent to A is denoted by U(A) 204. Because |U(A)|=3<|A|, it is evident that there does not exist a matching that matches each host bucket in A to a distinct host in U(A). Such a Hall set A acts as a proof that the desired matching does not exist. Those skilled in the art will appreciate that this proof can be transformed into a "certificate of infeasibility."

If infeasibility is not detected, one can proceed to a step to compute an assignment of hosts to host-buckets. In one or more embodiments of the invention, an algorithm performs (as detailed herein) a fixed number N of attempts to compute this assignment. Additionally, the algorithm can also proceed until a predetermined amount of computation time is used.

Each attempt can be described, by way of example, as follows. Graph G can be copied into G' and the HI constraints randomly can be randomly ordered: $HI(v_1)$, $HI(v_2)$, . . . , $HI(v_k)$. For i=1, 2, . . . , k, one or more embodiments of the invention assign the mini-partition p containing $v_i$, and all of the other mini-partitions in the same host-bucket, to a random host h adjacent to p in G'. If there is no host adjacent to p in G', this attempt can be declared as "failed" and one can go to the next attempt. Otherwise, the host-bucket containing p and h can be deleted from G' and the next i can be processed.

Another embodiment of the invention can include finding a matching in graph G of the host-buckets containing $v_1$, $v_2$, . . . , $v_k$ to the adjacent hosts. If there is no such matching, the algorithm detects an infeasibility. It transforms the corresponding Hall set into a "certificate of infeasibility," and outputs it. After processing the HI constraints, the HEX constraints can be ordered randomly: $HEX(S_1)$, $HEX(S_2)$, . . . , $HEX(S_q)$. For i=1, 2, . . . , q, one or more embodiments of the invention compute a sub-graph $G'(S_i)$ of G' induced on host-buckets in G' that contain at least one operator in $S_i$ and their adjacent hosts in G'. The host-buckets in $G'(S_i)$ that are already assigned to hosts while processing $G'(S_j)$ for j<i, and their corresponding hosts in $G'(S_i)$, are deleted from $G'(S_i)$. Then, a matching can be computed that matches each host-bucket in $G'(S_i)$ to a host in $G'(S_i)$. If there is no such matching, this attempt is declared as "failed" and one can go to the next attempt. Otherwise, each host-bucket in $G'(S_i)$ is assigned to its matched host. One can then process the next i.

If all the N attempts get declared "failed," the algorithm is declared to be "unsure" of the feasibility. Otherwise one can go to the next step.

As such, in outputting the partitions, host assignments, and induced host level constraints on computed partitions, if a host assignment of the host-buckets to hosts is computed that satisfies all the constraints, one or more embodiments of the invention output the mini-partitions as partitions and the corresponding host assignment. The host level constraints HP, HCL, HEX, HI induced on the computed partitions can be computed as follows. For each partition p, let HP(p)=∩{$H_v$|v∈p} be the intersection of the HP constraints for all operators in this partition. For each Host Co-location (or, for example, Ex-location) constraint HCL(S) (or, for example, HEX(S)), a constraint HCL(S') (or, for example, HEX(S')) can be created where S' is the set of partitions with non-empty intersection with S. Similarly, for each Host Isolation constraint HI(v), a constraint HI(p) can be created for partition p that contains v. If this process creates duplicate constraints, only one copy each of such constraints needs to be retained.

Additionally, one or more embodiments of the invention can include relaxation of constraints in case of infeasibility. In case the given set of constraints is infeasible or of unsure status, the techniques described herein provide a systematic way of relaxing the constraints and obtaining a subset of feasible constraints. To this end, a ranking on the types of constraints can be defined, for example, as follows:

PCL>PEX>PI>HP>HCL>HEX>HI.

That is, PCL is ranked higher than PEX, which is ranked higher than PI, and so on. This ranking gives precedence among the constraints. If it is determined that the given set of constraints is infeasible, that is, if the certificate of infeasibility is found, one or more embodiments of the invention relax (that is, delete) the constraints in the certificate in the order of lower to higher rank. If there are multiple candidate constraints of the same rank, that is, of the same type, one can break ties among them, for example, arbitrarily.

Additionally, one or more embodiments of the invention can run the constraint checker algorithm described above and determine if the remaining constraints are feasible. This process can also be repeated until a feasible subset of constraints is found. Once a feasible subset of constraints is found, one or more embodiments of the invention minimize the number of constraints relaxed during this process. As such, the relaxed constraints are ordered from higher to lower rank, breaking ties among constraints of the same rank (for example, arbitrarily). One can add back the constraint, say c, of the highest rank and determine if the resulting set of constraints is feasible. If yes, c is kept in the set of constraints. If no, c is relaxed permanently. One or more embodiments of the invention can then process the next constraint in the order, and repeat these steps until all of the relaxed constraints are processed, at which point, the resulting set of feasible constraints can be output.

Figure 3:
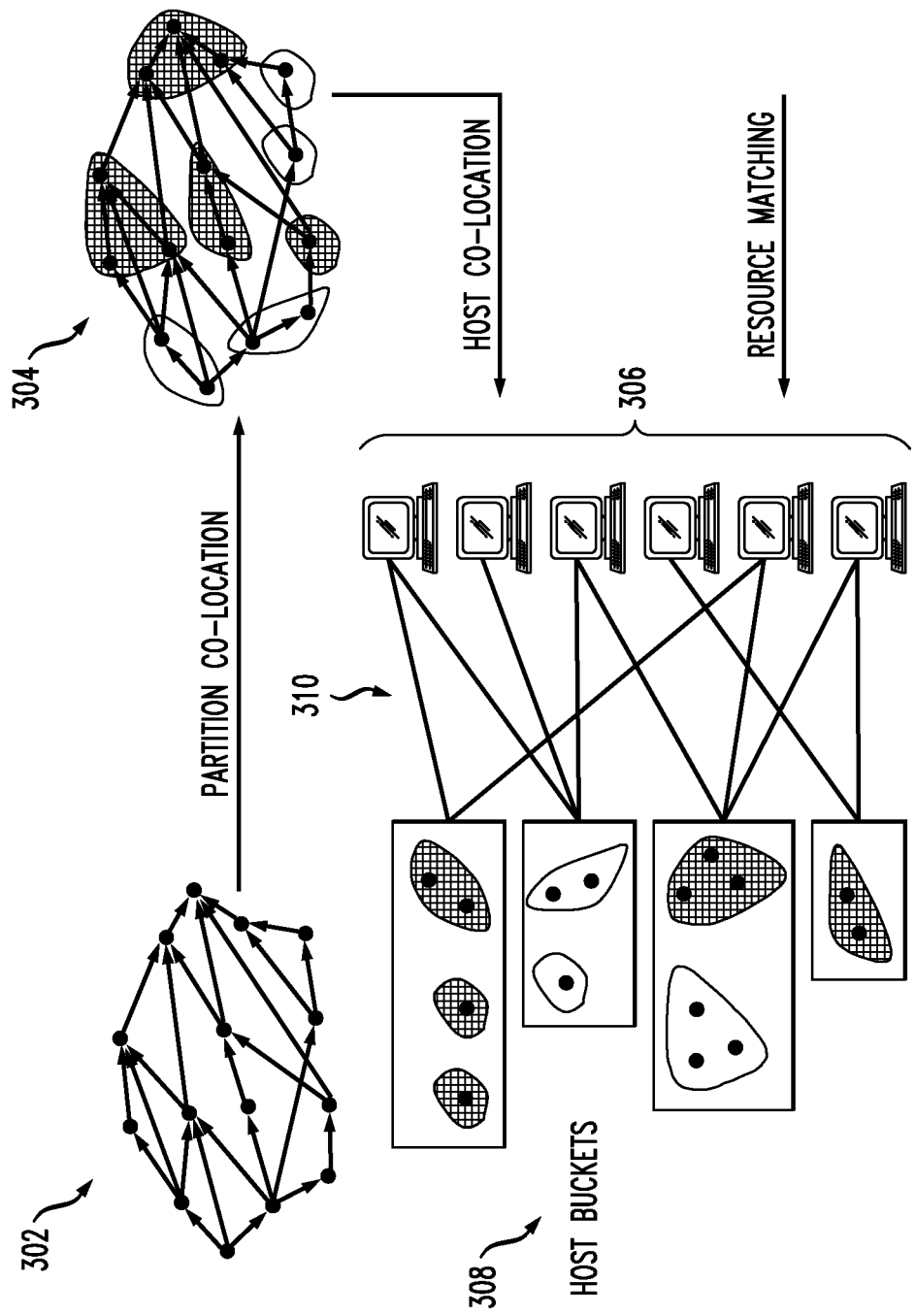
FIG. 3 is a pictorial depiction of the constraint feasibility algorithm, according to an embodiment of the present invention, following the flow chart in FIG. 1.

FIG. 3 is a pictorial depiction of the constraint feasibility algorithm, according to an embodiment of the present invention, following the flow chart in FIG. 1. By way of illustration, FIG. 3 depicts the original operator level data flow graph 302, the partition co-locations 304, the hosts 306, and the creation of host buckets 308 for purposes of host co-location. The host co-location and resource matching constraints are handled by consideration in step 310 of the bipartite graph connecting hosts 306 and host buckets 308. Additional description of the constraint feasibility algorithm is detailed herein (such as, for example, in connection with FIG. 1).

Figure 4:
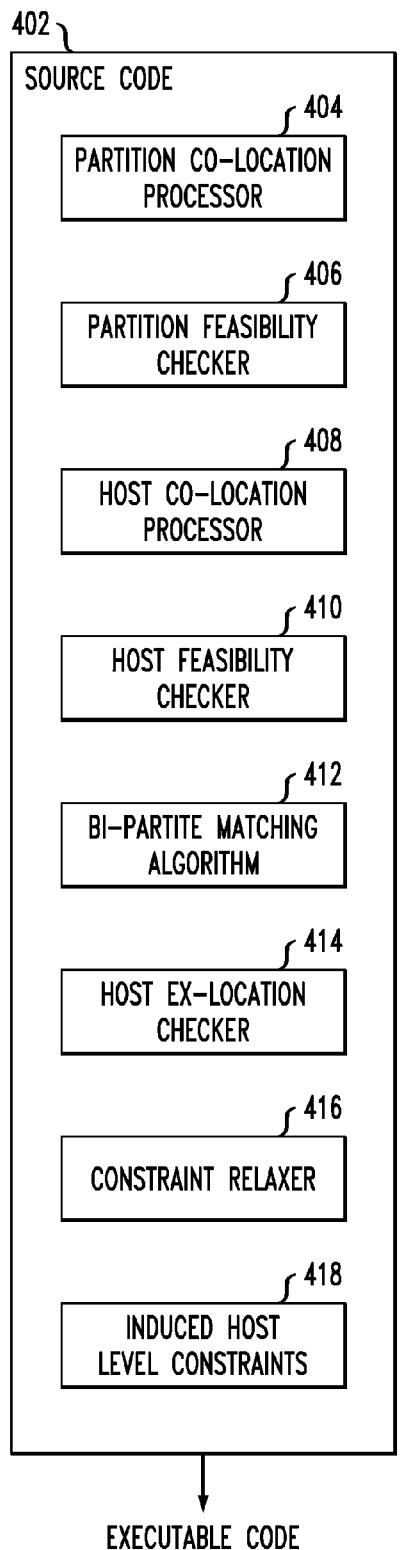
FIG. 4 is a block diagram illustrating an exemplary embodiment of a system for determining feasibility of a set of one or more operator partitioning constraints, according to an aspect of the invention.

FIG. 4 is a block diagram illustrating an exemplary embodiment of a system for determining feasibility of a set of one or more operator partitioning constraints, according to an aspect of the invention. By way of illustration, FIG. 4 depicts a system 402 that includes a partition co-location processor module 404, a partition feasibility checker module 406, a host co-location processor module 408, a host feasibility checker module 410, a bipartite matching algorithm module 412, a host ex-location checker module 414, a constraint relaxer module 416, and an induced host level constraints computer module 418. Additional description of the modules and the actions carried out thereby of the exemplary system depicted in FIG. 4 is detailed herein (such as, for example, in connection with FIG. 1).

Figure 5:
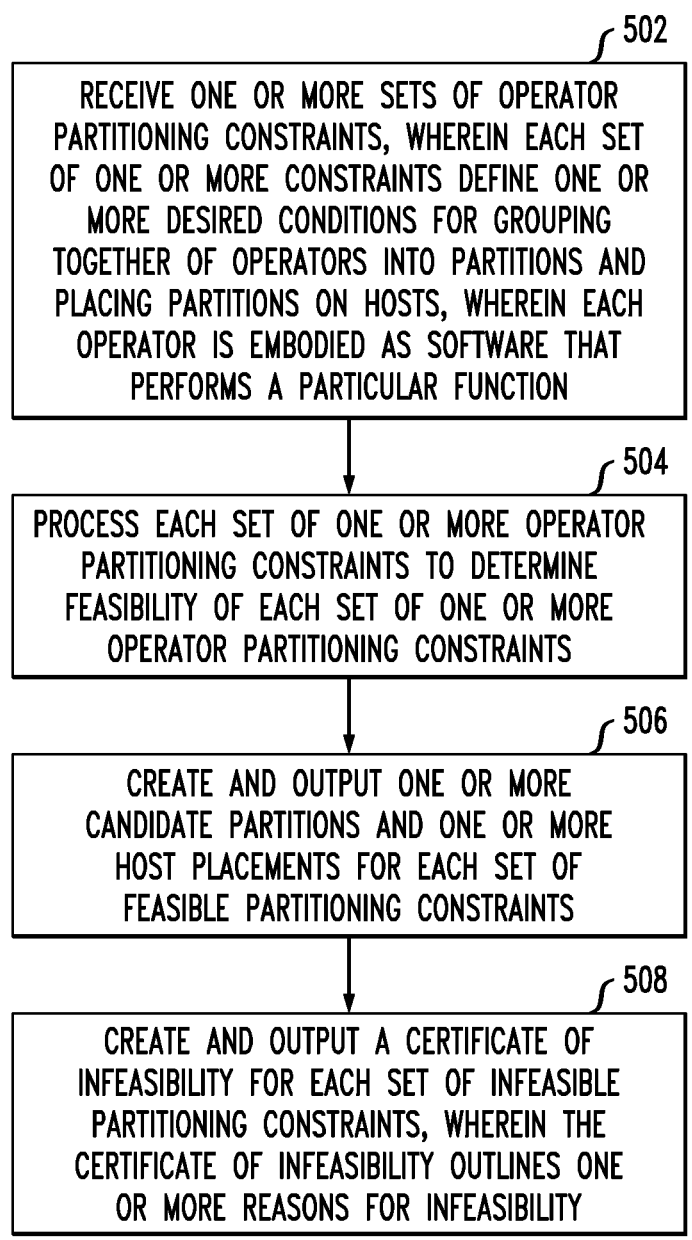
FIG. 5 is a flow diagram illustrating techniques for determining feasibility of a set of one or more operator partitioning constraints, according to an embodiment of the invention.

FIG. 5 is a flow diagram illustrating techniques for determining feasibility of a set of one or more operator partitioning constraints (for example, in a heterogeneous processor environment and/or a homogeneous processor environment), according to an embodiment of the present invention. Step 502 includes receiving one or more sets of operator partitioning constraints, wherein each set of one or more constraints define one or more desired conditions for grouping together of operators into partitions and placing partitions on hosts, wherein each operator is embodied as software that performs a particular function.

Step 504 includes processing each set of one or more operator partitioning constraints to determine feasibility of each set of one or more operator partitioning constraints. The operator partitioning constraints can include, for example, resource matching, wherein an operator can be assigned only to a particular subset of hosts, partition co-location, wherein two or more operators are fused into a same partition, partition ex-location, wherein two or more operators are fused into separate partitions, host co-location, wherein two or more operators are assigned to a same host, host ex-location, wherein two or more operators are assigned to separate hosts, partition isolation, wherein an operator is fused into a single partition, host isolation, wherein a partition containing an operator is placed on a host by itself, and/or high availability (HA), which creates multiple sub-graph replicas with partitions respecting sub-graphs and host ex-location constraints for any partitions in a distinct replica.

Determining feasibility of a set of operator partitioning constraints can include, for example, partition co-location by fusing one or more relevant operators into partial partitions, checking feasibility with partition and host ex-location constraints, processing host co-location by bucketing relevant partitions into host buckets, processing each resource matching constraint by computing intersections of resource matching constraints of operators in individual host buckets, and processing host ex-location by iterative steps of bookkeeping and a bipartite matching scheme.

Step 506 includes creating and outputting (for example, to a user) one or more candidate partitions and one or more host placements for each set of feasible partitioning constraints.

Step 508 includes creating and outputting (for example, to a user) a certificate of infeasibility for each set of infeasible partitioning constraints, wherein the certificate of infeasibility outlines one or more reasons for infeasibility. Creating and outputting a certificate of infeasibility for each infeasible partitioning constraint can include outputting an identity of each operator and constraint causing infeasibility if infeasibility arises from at least one of partition co-location, partition ex-location, partition isolation and host ex-location constraint, outputting an identity of each operator and constraint causing infeasibility if infeasibility arises from host co-location, resource matching, host ex-location and/or host isolation, and outputting a Hall set arising from infeasibility of a bipartite matching problem if infeasibility arises from at least one of host isolation, host ex-location and resource matching constraint.

One or more embodiments of the invention also include deploying the operators on hosts based on the candidate set of partitions.

The techniques depicted in FIG. 5 can also include outputting a message that no conclusion as to feasibility has been reached within a user-specified amount of computation time if a conclusion as to feasibility cannot be reached within the user-specified amount of computation time. One or more embodiments of the invention also include deriving induced host level constraints for computed partitions if a feasibility solution can be determined (for example, for use by a scheduler).

Additionally, the techniques depicted in FIG. 5 can include relaxing each constraint in an automated, pre-specified order, to automatically find a feasible set of one or more constraints. Further, one or more embodiments of the invention can include providing a user interface and enabling user-control of constraint relaxations and constraint revisions (for example, to find a feasible set of constraints).

As described herein, there can be one host placement (HP) constraint for each operator. Therefore, in one or more embodiments of the invention, the number of constraints will be at least the number of operators. Additionally, one or more embodiments of the invention can also be used to determine the feasibility of a set of partitioning constraints containing only one non-HP constraint. By way of example, a set containing a single non-HP constraint HEX ({o1,o2,o3}) is infeasible if there are only two hosts {h1,h2} available.

The techniques depicted in FIG. 5 can also, as described herein, include providing a system, wherein the system includes distinct software modules, each of the distinct software modules being embodied on a tangible computer-readable recordable storage medium. The distinct software modules can include, for example, a partition co-location processor module, a partition feasibility checker module, a host co-location processor module, a host feasibility checker module, a bipartite matching algorithm module, a host ex-location checker module, a constraint relaxer module, and an induced host level constraints computer module executing on a hardware processor.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 6:
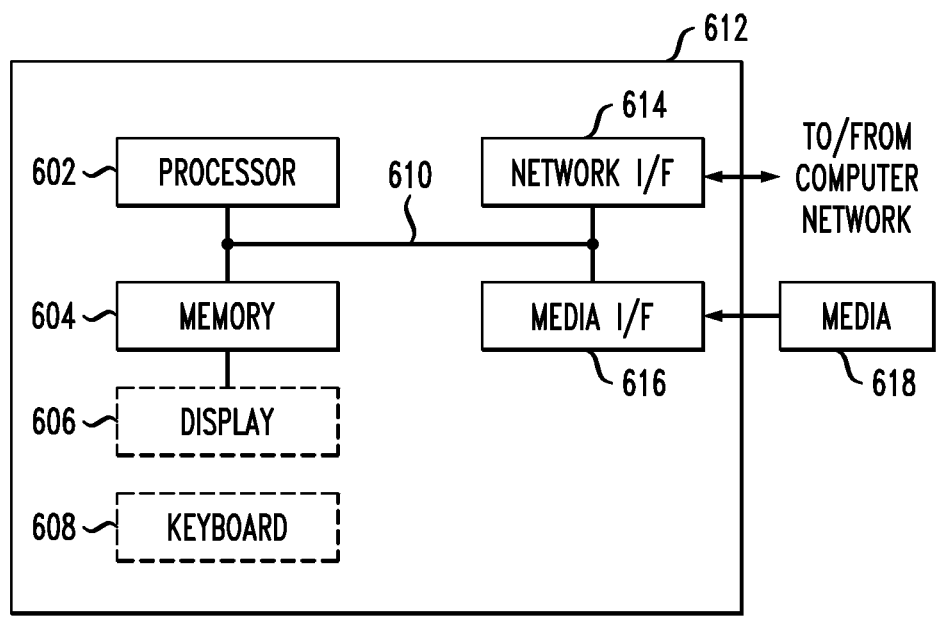
FIG. 6 is a system diagram of an exemplary computer system on which at least one embodiment of the invention can be implemented.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 618 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 4. The method steps can then be carried out using the distinct software modules and/or sub-modules of the system, as described above, executing on one or more hardware processors 602. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, providing a response to a feasibility question in advance of running an operating partition optimizer.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for determining feasibility of a set of one or more operator partitioning constraints, wherein the method comprises:

receiving one or more sets of operator partitioning constraints, wherein each set of one or more constraints define one or more desired conditions for grouping together of operators into partitions and placing partitions on hosts, wherein each operator is embodied as software that performs a particular function, and wherein said receiving is carried out on a distinct software module executing on a hardware processor;

processing each set of one or more operator partitioning constraints to determine (i) a feasible partitioning of operators into a fusion of operators and (ii) an assignment of the fusion of operators to a host, such that all operator partitioning constraints are satisfied, wherein said processing is carried out on a distinct software module executing on a hardware processor;

creating and outputting one or more candidate partitions and one or more host placements for each set of feasible partitioning constraints, wherein said creating and outputting one or more candidate partitions is carried out on a distinct software module executing on a hardware processor; and creating and outputting a certificate of infeasibility for each set of infeasible partitioning constraints, wherein the certificate of infeasibility outlines one or more reasons for infeasibility, wherein said creating and outputting a certificate is carried out on a distinct software module executing on a hardware processor, and wherein said outlining comprises:
- identifying each operator and constraint causing infeasibility arising from at least one of partition co-location, partition ex-location, partition isolation and host ex-location constraint;
- identifying each operator and constraint causing infeasibility arising from at least one of host co-location, resource matching, host ex-location and host isolation; and
- identifying a Hall set arising from infeasibility of a bipartite matching problem arising from at least one of host isolation, host ex-location and resource matching constraint.

2. The method of claim 1, further comprising outputting a message that no conclusion as to feasibility has been reached within a user-specified amount of computation time if a conclusion as to feasibility cannot be reached within the user-specified amount of computation time.

3. The method of claim 1, wherein the set of one or more operator partitioning constraints comprise at least one of:
- resource matching, wherein an operator can be assigned only to a particular subset of hosts;
- partition co-location, wherein two or more operators are fused into a same partition;
- partition ex-location, wherein two or more operators are fused into separate partitions;
- host co-location, wherein two or more operators are assigned to a same host;
- host ex-location, wherein two or more operators are assigned to separate hosts;
- partition isolation, wherein an operator is fused into a single partition;
- host isolation, wherein a partition containing an operator is placed on a host by itself; and
- high availability (HA), comprising creating multiple sub-graph replicas with partitions respecting sub-graphs and host ex-location constraints for any partitions in a distinct replica.

4. The method of claim 1, wherein determining feasibility of the set of one or more operator partitioning constraints comprises:
- partition co-location by fusing one or more relevant operators into one or more partial partitions;
- checking feasibility with partition and host ex-location constraints;
- processing host co-location by bucketing relevant partitions into one or more host buckets;
- processing each resource matching constraint by computing one or more intersections of resource matching constraints of operators in individual host buckets; and
- processing host ex-location by iterative steps of bookkeeping and a bipartite matching scheme.

5. The method of claim 1, wherein determining feasibility of the set of one or more operator partitioning constraints comprises determining feasibility of the set of one or more operator partitioning constraints in a heterogeneous processor environment.

6. The method of claim 1, further comprising deriving one or more induced host level constraints for computed partitions if a feasibility solution can be determined.

7. The method of claim 1, further comprising relaxing each constraint in an automated, pre-specified order, to automatically find a feasible set of one or more constraints.

8. The method of claim 1, further comprising providing a user interface and enabling user-control of constraint relaxations and constraint revisions.

9. The method of claim 1, further comprising providing a system, wherein the system comprises one or more distinct software modules, each of the one or more distinct software modules being embodied on a tangible computer-readable recordable storage medium, and wherein the one or more distinct software modules comprise a partition co-location processor module, a partition feasibility checker module, a host co-location processor module, a host feasibility checker module, a bipartite matching algorithm module, a host ex-location checker module, a constraint relaxer module, and an induced host level constraints computer module executing on a hardware processor.

10. A computer program product comprising a tangible computer readable recordable storage memory including computer useable program code for determining feasibility of a set of one or more operator partitioning constraints, the computer program product including:
- computer useable program code for receiving one or more sets of operator partitioning constraints, wherein each set of one or more constraints define one or more desired conditions for grouping together of operators into partitions and placing partitions on hosts, wherein each operator is embodied as software that performs a particular function;
- computer useable program code for processing each set of one or more operator partitioning constraints to determine (i) a feasible partitioning of operators into a fusion of operators and (ii) an assignment of the fusion of operators to a host, such that all operator partitioning constraints are satisfied;
- computer useable program code for creating and outputting one or more candidate partitions and one or more host placements for each set of feasible partitioning constraints; and
- computer useable program code for creating and outputting a certificate of infeasibility for each set of infeasible partitioning constraints, wherein the certificate of infeasibility outlines one or more reasons for infeasibility, and wherein said outlining comprises:
  - identifying each operator and constraint causing infeasibility arising from at least one of partition co-location, partition ex-location, partition isolation and host ex-location constraint;

identifying each operator and constraint causing infeasibility arising from at least one of host co-location, resource matching, host ex-location and host isolation; and identifying a Halt set arising from infeasibility of a bipartite matching problem arising from at least one of host isolation, host ex-location and resource matching constraint.

11. The computer program product of claim 10, further comprising computer useable program code for outputting a message that no conclusion as to feasibility has been reached within a user-specified amount of computation time if a conclusion as to feasibility cannot be reached within the user-specified amount of computation time.

12. The computer program product of claim 10, wherein the set of one or more operator partitioning constraints comprise at least one of:

resource matching, wherein an operator can be assigned only to a particular subset of hosts;

partition co-location, wherein two or more operators are fused into a same partition;

partition ex-location, wherein two or more operators are fused into separate partitions;

host co-location, wherein two or more operators are assigned to a same host;

host ex-location, wherein two or more operators are assigned to separate hosts;

partition isolation, wherein an operator is fused into a single partition;

host isolation, wherein a partition containing an operator is placed on a host by itself; and high availability (HA), comprising creating multiple sub-graph replicas with partitions respecting sub-graphs and host ex-location constraints for any partitions in a distinct replica.

13. The computer program product of claim 10, wherein the computer useable program code for determining feasibility of the set of one or more operator partitioning constraints comprises:

computer useable program code for partition co-location by fusing one or more relevant operators into one or more partial partitions;

computer useable program code for checking feasibility with partition and host ex-location constraints;

computer useable program code for processing host co-location by bucketing relevant partitions into one or more host buckets;

computer useable program code for processing each resource matching constraint by computing one or more intersections of resource matching constraints of operators in individual host buckets; and computer useable program code for processing host ex-location by iterative steps of bookkeeping and a bipartite matching scheme.

14. The computer program product of claim 10, further comprising computer useable program code for relaxing each constraint in an automated, pre-specified order, to automatically find a feasible set of one or more constraints.

15. The computer program product of claim 10, wherein the computer useable program code comprises one or more distinct software modules, and wherein the one or more distinct software modules comprise a partition co-location processor module, a partition feasibility checker module, a host co-location processor module, a host feasibility checker module, a bipartite matching algorithm module, a host ex-location checker module, a constraint relaxer module, and an induced host level constraints computer module executing on a hardware processor.

16. A system for determining feasibility of a set of one or more operator partitioning constraints, comprising:

a memory; and at least one processor coupled to the memory and operative to:

receive one or more sets of operator partitioning constraints, wherein each set of one or more constraints define one or more desired conditions for grouping together of operators into partitions and placing partitions on hosts, wherein each operator is embodied as software that performs a particular function;

process each set of one or more operator partitioning constraints to determine (i) a feasible partitioning of operators into a fusion of operators and (ii) an assignment of the fusion of operators to a host, such that all operator partitioning constraints are satisfied;

create and output one or more candidate partitions and one or more host placements for each set of feasible partitioning constraints; and create and output a certificate of infeasibility for each set of infeasible partitioning constraints, wherein the certificate of infeasibility outlines one or more reasons for infeasibility, and wherein said outlining comprises:

identifying each operator and constraint causing infeasibility arising from at least one of partition co-location, partition ex-location, partition isolation and host ex-location constraint;

identifying each operator and constraint causing infeasibility arising from at least one of host co-location, resource matching, host ex-location and host isolation; and identifying a Hall set arising from infeasibility of a bipartite matching problem arising from at least one of host isolation, host ex-location and resource matching constraint.

17. The system of claim 16, wherein the at least one processor coupled to the memory is further operative to output a message that no conclusion as to feasibility has been reached within a user-specified amount of computation time if a conclusion as to feasibility cannot be reached within the user-specified amount of computation time.

18. The system of claim 16, wherein the set of one or more operator partitioning constraints comprise at least one of:

resource matching, wherein an operator can be assigned only to a particular subset of hosts;

partition co-location, wherein two or more operators are fused into a same partition;

partition ex-location, wherein two or more operators are fused into separate partitions;

host co-location, wherein two or more operators are assigned to a same host;

host ex-location, wherein two or more operators are assigned to separate hosts;

partition isolation, wherein an operator is fused into a single partition;

host isolation, wherein a partition containing an operator is placed on a host by itself; and high availability (HA), comprising creating multiple sub-graph replicas with partitions respecting sub-graphs and host ex-location constraints for any partitions in a distinct replica.

19. The system of claim 16, wherein the at least one processor coupled to the memory operative to determine feasibility of the set of one or more operator partitioning constraints is further operative to:
- partition co-location by fusing one or more relevant operators into one or more partial partitions;
- check feasibility with partition and host ex-location constraints;
- process host co-location by bucketing relevant partitions into one or more host buckets;
- process each resource matching constraint by computing one or more intersections of resource matching constraints of operators in individual host buckets; and
- process host ex-location by iterative steps of bookkeeping and a bipartite matching scheme.

20. The system of claim 16, wherein the at least one processor coupled to the memory is further operative to relax each constraint in an automated, pre-specified order, to automatically find a feasible set of one or more constraints.

21. The system of claim 16, further comprising a tangible computer-readable recordable storage medium having one or more distinct software modules embodied thereon, the one or more distinct software modules comprising a partition co-location processor module, a partition feasibility checker module, a host co-location processor module, a host feasibility checker module, a bipartite matching algorithm module, a host ex-location checker module, a constraint relaxer module, and an induced host level constraints computer module executing on a hardware processor.

22. An apparatus for determining feasibility of a set of one or more operator partitioning constraints, the apparatus comprising:
- means for receiving one or more sets of operator partitioning constraints, wherein each set of one or more constraints define one or more desired conditions for grouping together of operators into partitions and placing partitions on hosts, wherein each operator is embodied as software that performs a particular function;
- means for processing each set of one or more operator partitioning constraints to determine (i) a feasible partitioning of operators into a fusion of operators and (ii) an assignment of the fusion of operators to a host, such that all operator partitioning constraints are satisfied;
- means for creating and outputting one or more candidate partitions and one or more host placements for each set of feasible partitioning constraints; and
- means for creating and outputting a certificate of infeasibility for each set of infeasible partitioning constraints, wherein the certificate of infeasibility outlines one or more reasons for infeasibility, and wherein said outlining comprises:
  - identifying each operator and constraint causing infeasibility arising from at least one of partition co-location, partition ex-location, partition isolation and host ex-location constraint;
  - identifying each operator and constraint causing infeasibility arising from at least one of host co-location, resource matching, host ex-location and host isolation; and
  - identifying a Hall set arising from infeasibility of a bipartite matching problem arising from at least one of host isolation, host ex-location and resource matching constraint.

* * * * *